United States Patent [19]
Lee et al.

[11] Patent Number: 5,780,840
[45] Date of Patent: Jul. 14, 1998

[54] CLOSE CONTACT TYPE IMAGE SENSOR HAVING INTEGRALLY MODED REFLECTIVE SURFACES

[75] Inventors: Young-Jae Lee, Seoul; Seung-Shik Jung; Dong-Choul Yang, both of Suwon, all of Rep. of Korea

[73] Assignee: Samsung Electronics Co., Ltd., Suwon, Rep. of Korea

[21] Appl. No.: 677,817

[22] Filed: Jul. 9, 1996

[30] Foreign Application Priority Data

Oct. 12, 1995 [KR] Rep. of Korea ............... 1995-35204

[51] Int. Cl.$^6$ ........................................... G01J 1/04
[52] U.S. Cl. ........................... 250/208.1; 358/482
[58] Field of Search ...................... 250/208.1, 216; 358/482–483, 471, 493, 494

[56] References Cited

U.S. PATENT DOCUMENTS

| | | | |
|---|---|---|---|
| 5,182,445 | 1/1993 | Yamashita | 250/208.1 |
| 5,280,364 | 1/1994 | Kihara et al. | 358/471 |
| 5,383,034 | 1/1995 | Imamura et al. | 250/208.1 |
| 5,434,682 | 7/1995 | Imamura et al. | 250/208.1 |
| 5,579,114 | 11/1996 | Imamura | 358/484 |

*Primary Examiner*—Stephone B. Allen
*Attorney, Agent, or Firm*—Marger, Johnson, McCollom & Stolowitz, PC

[57] ABSTRACT

A close contact type image sensor having an improved structure and manufacturing process utilizes a body having integral reflective surfaces to eliminate assembly steps. The body and reflective surfaces are formed using different plastic materials in a single injection molding process. A material having highly reflective characteristics is used for the reflective surfaces. A light source is aligned with the reflective surface by pins in the sensor body which are inserted into holes in the light source. Alternatively, the light source can be mounted on a printed circuit board which has holes that are aligned with the pins. A self focusing lens is mounted in the body to focus reflected light onto a light detector which is mounted on a printed circuit board. A transparent cover piece is mounted in an opening in the body. Flat spring clips secure the printed circuit board to the body of the sensor.

12 Claims, 3 Drawing Sheets

CLOSE CONTACT TYPE IMAGE SENSOR HAVING INTEGRALLY MODED REFLECTIVE SURFACES

BACKGROUND OF THE INVENTION

1. Field of the Invention

The present invention relates generally to image sensors for scanning images, and more specifically, to a close contact type image sensor having an improved structure and manufacturing process.

2. Description of the Related Art

Image sensors are input devices that are widely used to scan images in electronic copiers, document scanners, facsimile machines, image processors, and banking apparatus. A common type of image sensor is the close contact type, so called because the sensor comes into contact with the media on which the image is being scanned.

Referring to FIGS. 1 and 2, a prior art close contact scanner includes a molded body 6 having a horizontal upper opening that is covered by a transparent cover piece 2 which is secured to the body 6. The cover piece 2 is typically made of glass. A piece of paper 1 having text or other images to be scanned is driven over the transparent sheet by a roller having an axial reference line Rf. A light source 5, typically a light emitting diode (LED) array, is mounted in the lower portion of a guide 3. The guide protects the light source and directs light from the light source onto the paper along the reference line Rf. The guide 3 is removably mounted in the body 6 and is aligned so that light from the source 5 strikes the paper at an appropriate angle.

As the paper or other media is moved over the sensor, light reflected from the image passes through a self focusing lens 4 which is secured vertically within the body. The lens 4 is aligned with the reference line Rf so as to focus the reflected light from the image onto an optoelectronic light detector 9 such as an integrated array of optical transistors. The detector converts the reflected light from the image into data in the form of electronic signals. The detector is mounted on a printed circuit board (PCB) 8 which is secured to the lower portion of the body by flat spring clips 7 which grip the sides and lower portion of the body. The electronic signals are then transferred to a processing system through a connector.

A conventional image sensor as described above is manufactured in the following manner. First, the body 6 is formed by using an injection molding die, and the self focusing lens 4 is secured within the body 6. Then with the LED array 5 is secured to the optical guide 3 which is next inserted into the body 6 by press fitting. The transparent piece 2 is fixed to the upper opening of the body 6, while the PCB 8 with the light detecting device attached thereon is positioned in the lower opening of the body 6. Using one or more flat springs 7, the PCB 8 is secured to the body 6. The center of the optical-electric light detector 9 is positioned at the axial line of the focusing lens 4.

The optical guide 3 is formed through a plastic extrusion process which produces parts having inconsistent dimensions. However, because the guide is press fit in the body, the dimensions of guide and the body must be closely matched. Therefore, the parts must be measured and matched at each step in the manufacturing process. This increases the time, complexity and cost of manufacturing the sensor. Accordingly, a need remains for an improved sensor and method of manufacture which overcome the problems described above.

SUMMARY OF THE INVENTION

It is, therefore, an object of the invention to provide an image sensor that is simple and inexpensive to manufacture.

One aspect of the present invention is an image sensor comprising a light source; a body having an opening and an integral reflective surface, the reflective surface aligned to reflect light from the light source through the opening and onto an image surface; and a light detector for receiving light reflected off the image surface and back through the opening.

The image sensor can include a second reflective surface aligned to reflect light from the light source through the opening. The body can be fabricated from a first material and the sensor can further include a reflecting piece fabricated from a second material, the reflective surface located on the reflecting piece. A pin can be mounted to the body for aligning the light source with the reflective surface.

The light source can include a hole for receiving the pin, or the sensor can further include a printed circuit board having a hole for receiving the pin, the light source being integral with the printed circuit board. Alternatively, the light source and light detector can be mounted on a printed circuit board having a hole for receiving the pin.

Another aspect of the present invention is an image sensor comprising a body having an opening; a light source disposed within the body such that light from the light source is directed through the opening and onto an image surface; a light detector for receiving light reflected off the image surface and back through the opening; and a pin for aligning the light source with the body. The pin can be integral with the body, and the light source can include a hole for receiving the pin. The light source and light detector can be mounted on a printed circuit board, or the light source can be integral with the printed circuit board and the printed circuit board can include a hole for receiving the pin.

Another aspect of the present invention is a method for making an image sensor comprising the steps of forming a body; forming an integral reflective surface on the body; coupling a light source to the body; and coupling a light detector to the body. The steps of forming the body and forming the integral reflective surface can be substantially simultaneous.

The steps of forming the body and forming the integral reflective surface can include the steps of injecting a first material into a mold, thereby forming the body; and injecting a second material into the mold, thereby forming the reflective surface.

The step of coupling the light source to the body can include the steps of forming a pin on the body; aligning the pin with a hole in the light source; and inserting the pin into the hole, thereby aligning the light source with the reflective surface. Alternatively, the step of coupling the light source to the body includes the steps of forming a pin on the body; coupling the light source to a printed circuit board having a hole; aligning the pin with the hole; and inserting the pin into the hole, thereby aligning the light source with the reflective surface.

The steps of coupling the light source to the body and coupling the light detector to the body can include the steps of forming a pin on the body; coupling the light source to a printed circuit board having a hole; coupling the light detector to the printed circuit board; aligning the pin with the hole; and inserting the pin into the hole, thereby aligning the light source with the reflective surface.

The foregoing and other objects, features and advantages of the invention will become more readily apparent from the

3 following detailed description of a preferred embodiment which proceeds with reference to the drawings.

DETAILED DESCRIPTION OF THE PREFERRED EMBODIMENT

Figure 1:
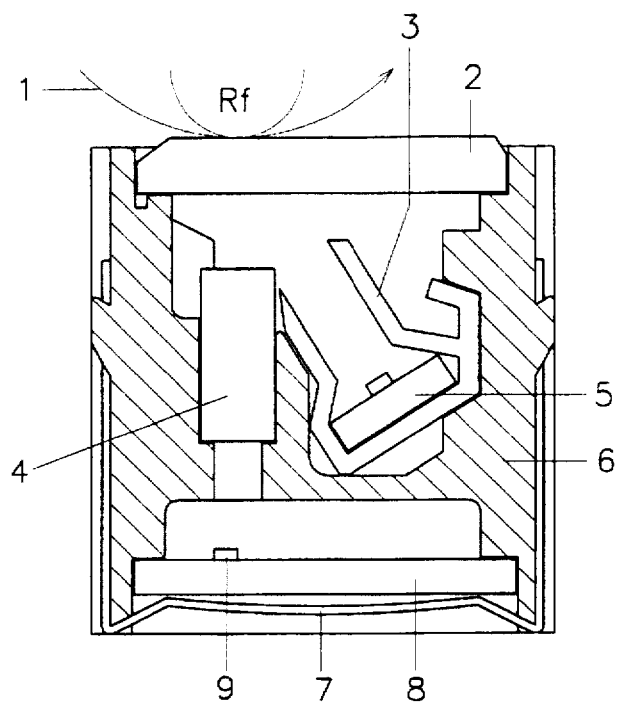
FIG. 1 is a sectional view of a prior art image scanning head.
Figure 2:
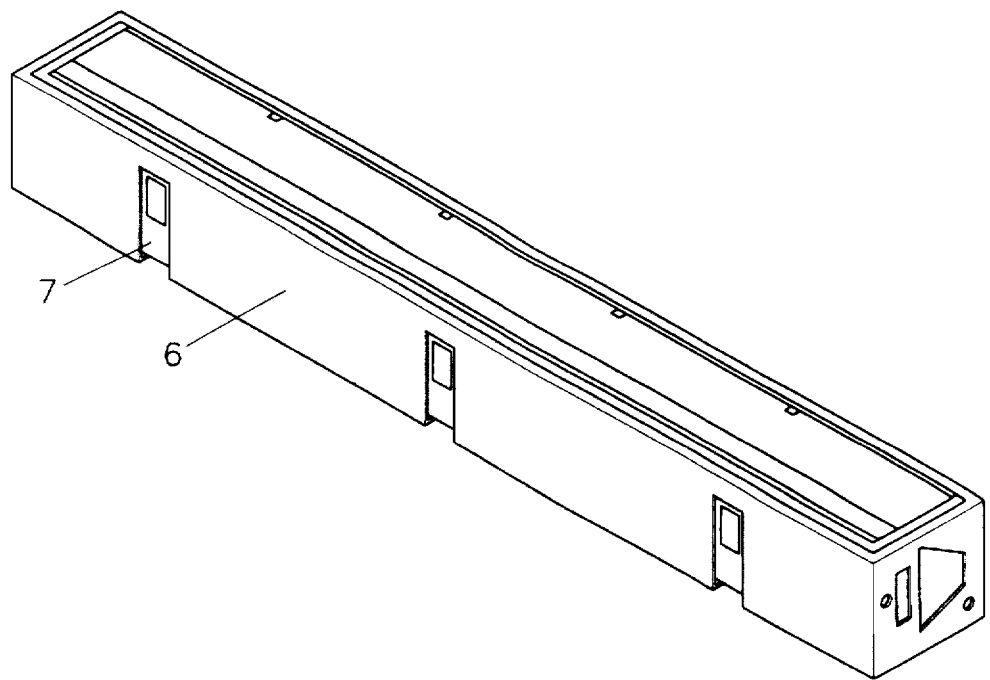
FIG. 2 is a perspective view of the prior art image scanning head of FIG. 1.
Figure 3:
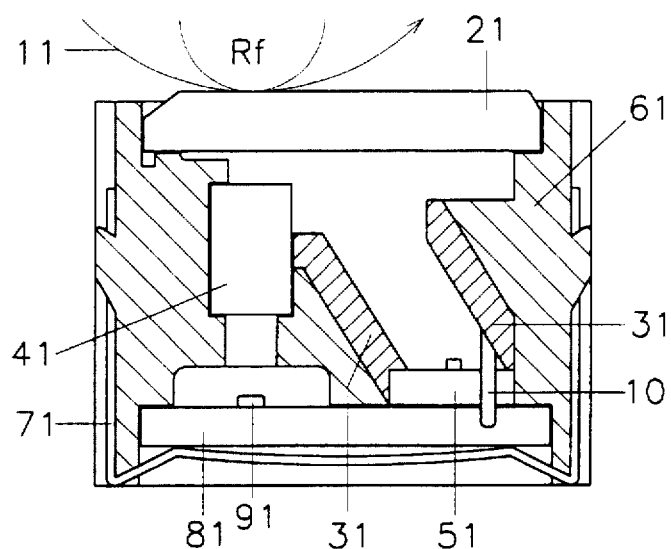
FIG. 3 is a sectional view of an embodiment of an image scanning head in accordance with the present invention.

FIG. 3 shows a sectional view of an embodiment of a close contact type image sensor according to the present invention. The structure of the sensor will be described followed by a description of the operation. Then a description of the method of manufacture will be provided.

The sensor includes a body 61 made of a plastic material. A transparent cover piece 21 made of glass or the like is horizontally coupled into an upper opening of the body 61. The cover piece supports a sheet of paper 11 or other media which is driven by a roller having an axial reference line Rf. Two reflecting pieces 31 made of a highly reflective plastic material are integrally coupled into the body 61. The reflecting pieces 31 have reflective surfaces and are inclined relative to the reference line Rf so that light rays from a light source 51 are guided out through the opening, through the cover piece, and onto the sheet of paper 11 along reference line Rf. A self focusing lens 41 is secured vertically within the body 61 adjacent to the reflecting pieces in such a manner that light reflected off the sheet of paper and back into the opening passes through the lens 41 and is focused on a light detector 91.

Light source 51 is in a flat package that is horizontally coupled to the body 61 under the reflecting pieces in such a manner that light from the light source is directed by the reflective surfaces out through the opening. The light source 51 is typically an LED array or any other light source suitable for illuminating the image to be scanned. A printed circuit board (PCB) 81 is coupled to a lower opening of the body 61 and supports the light source 51. A light detector 91 is attached to the PCB and positioned so that light reflected off of the sheet of paper 11 along the reference line Rf and passing through the lens 41 is focused on the light detector. The light detector is typically an integrated array of optotransistors or other optoelectronic device capable of converting optical data into electronic signals.

A series of pins 10 protrude vertically from one of the reflecting pieces 31. On the light source 51 and the PCB 81, there are holes and slots correspondingly with the pins 10. The light source 51 and the reflective surfaces are aligned by means of the pins 10. The pins and holes can be seen in more detail in the perspective view of FIG. 4.

A set of flat springs 71 grip two sides and the bottom of the body 61, and the bottom face of the flat spring 71 secures the PCB 81 to the body. The springs have slots which latch on ears that protrude from the sides of the body.

Figure 4:
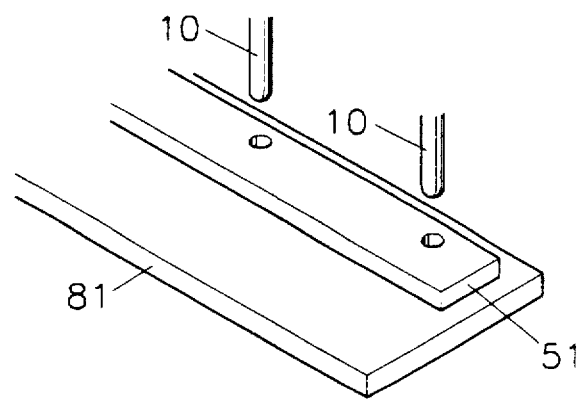
FIG. 4. is a perspective view showing details of the light source and pins of the image scanning head of FIG. 3.
Figure 5:
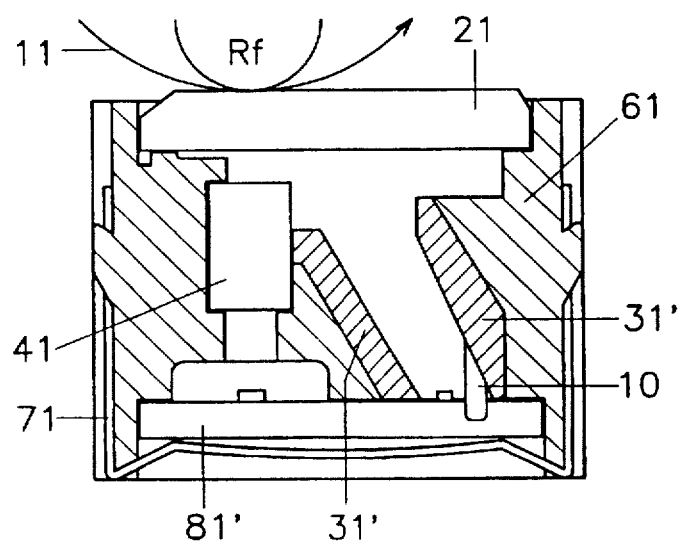
FIG. 5. is a sectional view of an alternative embodiment of an image scanning head in accordance with the present invention.

An alternative embodiment of a scanner in accordance with the present invention is shown in FIG. 5. This embodiment differs from the embodiment of FIGS. 3 and 4 in that the light source 51 is not provided in a separate package, but is integrally mounted to the PCB.

In both embodiments, and light detector 91 is typically coupled to drive electronics on the PCB which are coupled to a processing system through a connector (not shown) on the PCB.

In operation, light from the light source 51 is reflected by the reflective pieces 31 and guided or directed out through the opening in the body 61 and through the transparent cover piece 21. A sheet of paper 11 with an image to be scanned thereon is driven over the transparent piece 21 by a roller having a axial reference line Rf. Light rays are reflected off the sheet by the image and pass back through the opening and through the lens 41. The lens focuses the light on the light detector 91 which is converts optical signals from the image into data in the form of electronic signals. The electronic signals are then transferred to a system for processing.

The manufacturing method for a close contact type image sensor of FIGS. 3 and 4 will now be described. First, a die having a dual structure is prepared. Using this die, the body 61, the reflecting pieces 31 and the pins 10 are integrally formed through one round of injection molding by using two kinds of plastic materials. The reflecting pieces 31 and the body 61 are composed of different materials. The body and pins are formed by injecting one type of plastic into the mold, and the reflective pieces are formed by injecting a second type of plastic into the mold. A material having characteristics and a color which can improve the brilliancy and efficiency of the reflective surfaces is selected for the second material in the plastic injection molding process. Thus a highly reflective surface is formed simultaneously with the injection molding of the body. This eliminates the need to measure and match components, thereby eliminating expensive manufacturing steps.

Next, the self focusing lens 41 is vertically mounted within the body 61, and the transparent cover piece 21 is horizontally attached to the upper opening of the body 61. Then the light source is inserted into the lower opening of the body 61, and the pins 10 are aligned with, and inserted into, the holes of the light source 51. This automatically aligns the light source with the reflective surfaces, thereby simplifying the assembly process. Then the PCB 81 on which the light detector 91 is attached is inserted into the lower opening of the body 61. The insertion is carried out in such a manner that the pins 10 extending from the body 61 are aligned with the holes or slots of the PCB 81 thereby aligning the light detector with the lens 41. Finally, the flat springs 71 are snapped over the PCB and sides of the body 61 thereby fastening the PCB to the body.

In the embodiment of FIG. 5, the light source does not have a separate package, but instead, the light source is formed on the PCB 81. Therefore, there is no step of inserting the light source, but the pins 10 of the body 61 are inserted into the slots of the PCB 81 thereby aligning the light source and light detector with the reflective surfaces and lens respectively. This eliminates the need for a separate step for aligning and inserting the light source, thus improving the efficiency of the manufacturing process. Then, by utilizing the flat springs 71, the PCB 81 and the body 61 are coupled together.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An image sensor comprising:
   a light source;
   a body having a structural portion made of a plastic material and a reflecting piece made of a second plastic material integrally molded with the structural portion, the reflecting piece having a non-metallic reflective surface aligned to reflect light from the light source through an opening in the body and onto an image surface; and
   a light detector for receiving light reflected off the image surface and back through the opening.

2. An image sensor according to claim 1 wherein the body further includes a second reflective piece having a reflective surface aligned to reflect light from the light source through the opening, the second reflecting piece being made of the second plastic material and integrally molded with the structural portion.

3. An image sensor according to claim 1 further including a pin mounted to the body for aligning the light source with the reflective surface.

4. An image sensor according to claim 3 wherein the light source includes a hole for receiving the pin.

5. An image sensor according to claim 3 further including a printed circuit board having a hole for receiving the pin, the light source being integral with the printed circuit board.

6. An image sensor according to claim 3 wherein the light source and light detector are mounted on a printed circuit board having a hole for receiving the pin.

7. An image sensor according to clam 6 further including:
   a transparent cover disposed over the opening;
   a lens mounted in the body for focusing light onto the light detector; and
   at least one spring clip attached to the body, thereby securing the printed circuit board to the body.

8. An image sensor comprising:
   a body having an opening and integrally molded non-metallic reflecting means for reflecting light through the opening;
   a light source disposed within the body such that light from the light source is directed through the opening and onto an image surface;
   a light detector for receiving light reflected off the image surface and back through the opening; and
   a pin for aligning the light source with the body.

9. An image sensor according to claim 8 wherein the pin is integral with the body.

10. An image sensor according to claim 8 wherein the light source includes a hole for receiving the pin.

11. An image sensor according to claim 8 wherein the light source and light detector are mounted on a printed circuit board.

12. An image sensor according to claim 8 wherein the light source is integral with the printed circuit board and the printed circuit board includes a hole for receiving the pin.

* * * * *

UNITED STATES PATENT AND TRADEMARK OFFICE
CERTIFICATE OF CORRECTION

PATENT NO. : 5,780,840
DATED : July 14, 1998
INVENTOR(S) : Lee et al.

It is certified that error appears in the above-identified patent and that said Letters Patent is hereby corrected as shown below:

<u>Title page,</u>
Item [54], Title, "MODED" should read -- MOLDED --.

<u>Column 5,</u>
Line 6, "a plastic" should read -- a first plastic --.
Line 16, "reflective" should read -- reflecting --.

Signed and Sealed this

Fifth Day of November, 2002

Attest:

JAMES E. ROGAN
Attesting Officer
Director of the United States Patent and Trademark Office